Figure 1:
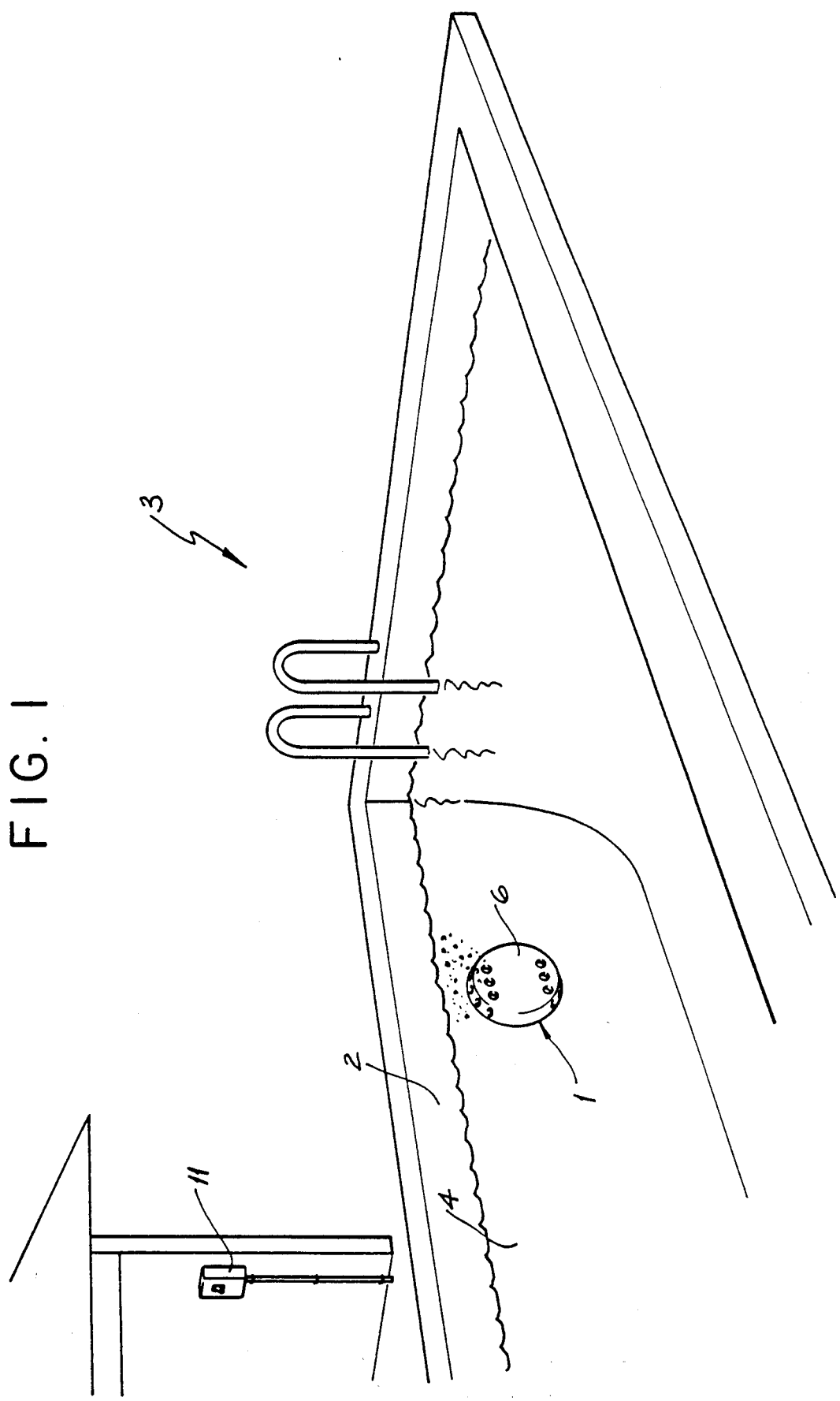

United States Patent [19]

Howlett

[11] Patent Number: 4,997,540

[45] Date of Patent: Mar. 5, 1991

[54] IN-POOL CONVECTION SALTWATER CHLORINATOR

[75] Inventor: Neil G. Howlett, Menai, Australia

[73] Assignee: Poolrite Equipment Pty. Ltd., Auburn, Australia

[21] Appl. No.: 409,626

[22] Filed: Sep. 19, 1989

[30] Foreign Application Priority Data

Sep. 19, 1988 [AU] Australia ................ PJ0487

[51] Int. Cl.⁵ .................. C25B 9/00; C25B 15/08
[52] U.S. Cl. .................... 204/271; 204/272; 204/275; 204/278
[58] Field of Search ............ 204/271, 272, 275–278, 204/149, 228, 128

[56] References Cited

U.S. PATENT DOCUMENTS 3,222,269 12/1965 Stanton ................ 204/272 X
3,476,675 11/1969 Colvin et al. ........... 204/278 X
4,419,207 12/1983 Bindon ................. 204/278 X
4,861,451 8/1989 David .................. 204/278 X Primary Examiner—Donald R. Valentine
Attorney, Agent, or Firm—Ladas & Parry

[57] ABSTRACT

Apparatus is provided for the chlorination of water in a swimming pool where the water includes a soluble chlorine ion containing electrolyte. The apparatus comprises a housing which is mounted on the side wall of a swimming pool under the water level. The housing has a plurality of electrodes located therein, the electrodes being connected to a low voltage power supply. The housing has a plurality of openings from the outside to the interior, whereby water is able to pass in and out of the housing, where electrolysis of the soluble chlorine ions takes place when they come into contact with the electrodes. The water which has been effectively chlorinated passes out of the housing to be replaced by other water with the soluble chlorine ion still in solution.

18 Claims, 6 Drawing Sheets

IN-POOL CONVECTION SALTWATER CHLORINATOR

The present invention relates to apparatus for the chlorination of water, and in particular, to apparatus which is locatable within a swimming pool.

Previously known electrolytic chlorinating devices for swimming pools as disclosed in Australian Pat. No. 569026 issued to Sal-Chlor Pty Ltd have been used whereby electrodes are located in a housing outside the confines of a swimming pool with at least two pipes connecting the housing to the swimming pool. The housing is in fluid communication with the swimming pool to enable the sodium chloride which is in solution in the swimming pool water to ve electolyzed within the housing and then hence returned to the swimming pool either by convention or by means of a circulation pump.

The disadvantages of such a system as described above is the installation costs of the extra housing and piping required and the difficulties of complete chlorination of the pool due to poor convection and/or poor circulation due toi the circulation pump.

In Australian patent specification No. 43263/72 by Askew and Moir, a method and apparatus to chlorinate swimming pool water is disclosed, whereby an electrolytic cell is by immersing into the water, and the water passes through openings in the cell and electrolysis of a compound introduced to the water frees a chlorine gas into the water. In this specification a variety of ways are described where the water is pumped through the filtration system into the electrolytic cell.

It is an object of the present invention to provide an in-pool convection salt water chlorinator which substantially overcomes or ameliorates the abovementioned disadvantages.

According to one aspect of the present invention there is disclosed apparatus for the chlorination of water in a swimming pool where the water includes a soluble chlorine ion containing electrolyte, said apparatus comprising a housing which is mountable on a side wall of said swimming pool, said housing having at least one opening for the water to pass therethrough, at least one pair of electrodes located within said housing, said electrodes being supplied by a low-voltage DC power supply, wherein the convection of the pool water through the opening(s) causes electrolysis of the soluble chlorine ion, when they come into contact with said electrodes, to produce a chlorination effect of said water.

One embodiment of the present invention will now be described in reference to the drawings in which:

FIG. 1 is a perspective view of a swimming pool inclusive of the apparatus of the present invention for the chlorination of water in the swimming pool.

Figure 2:
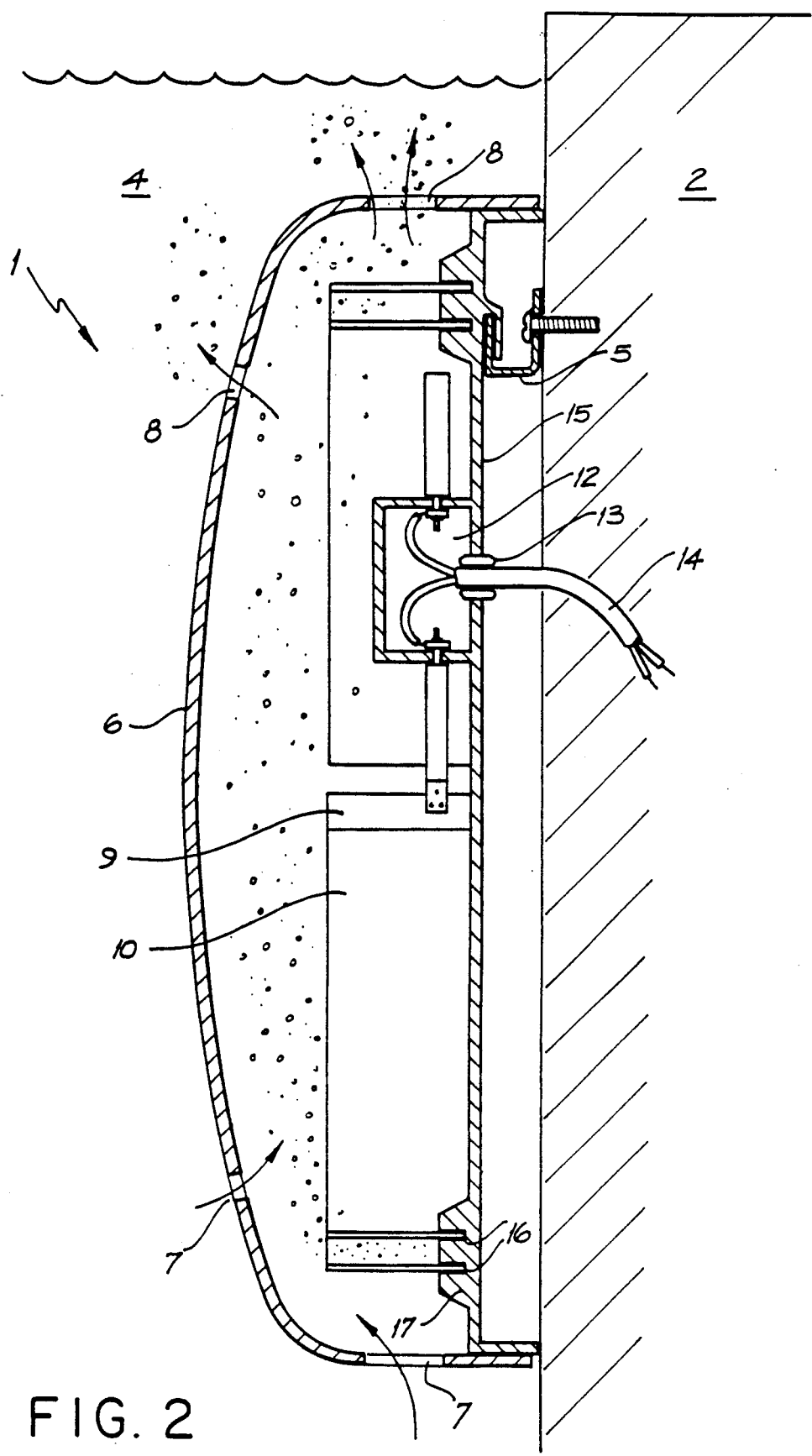
Figure 3:
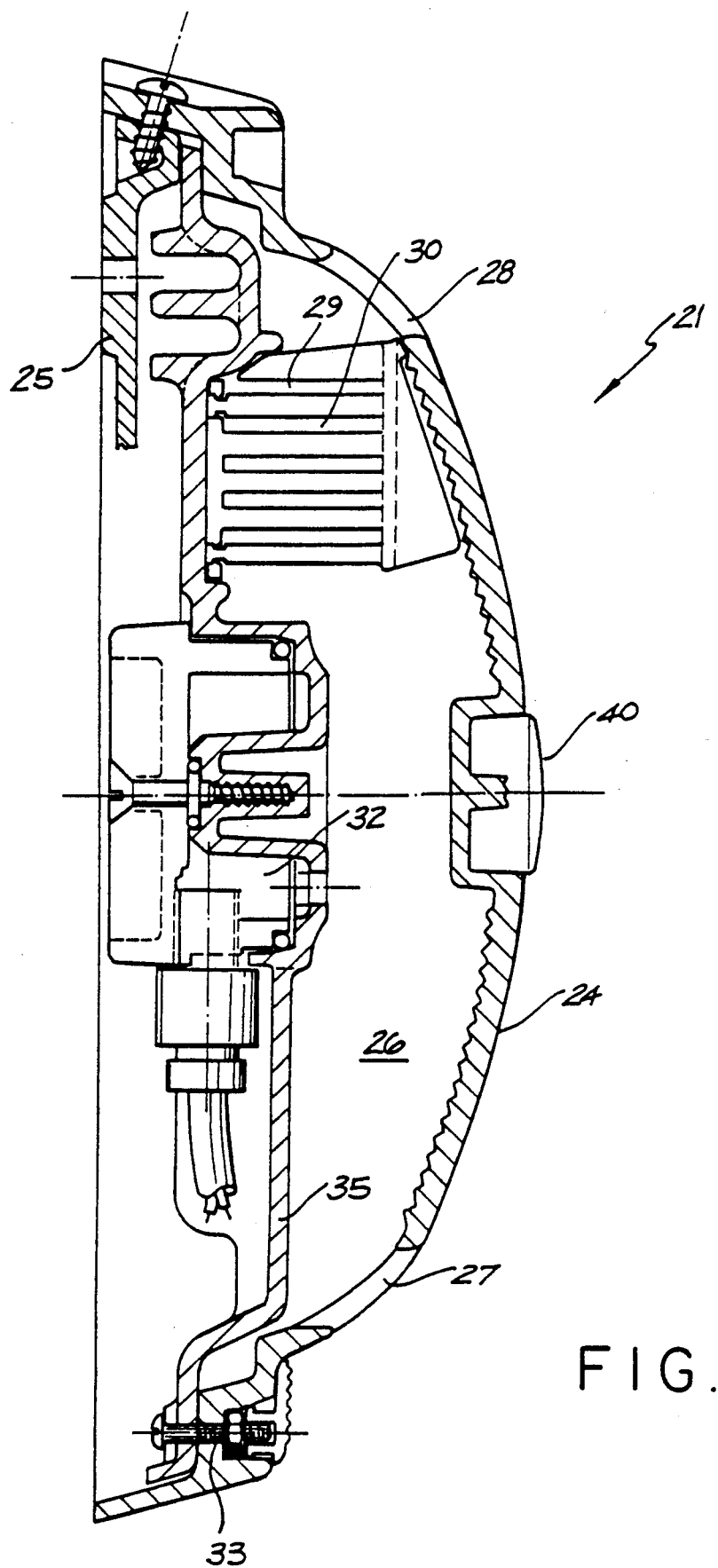
Figure 4:
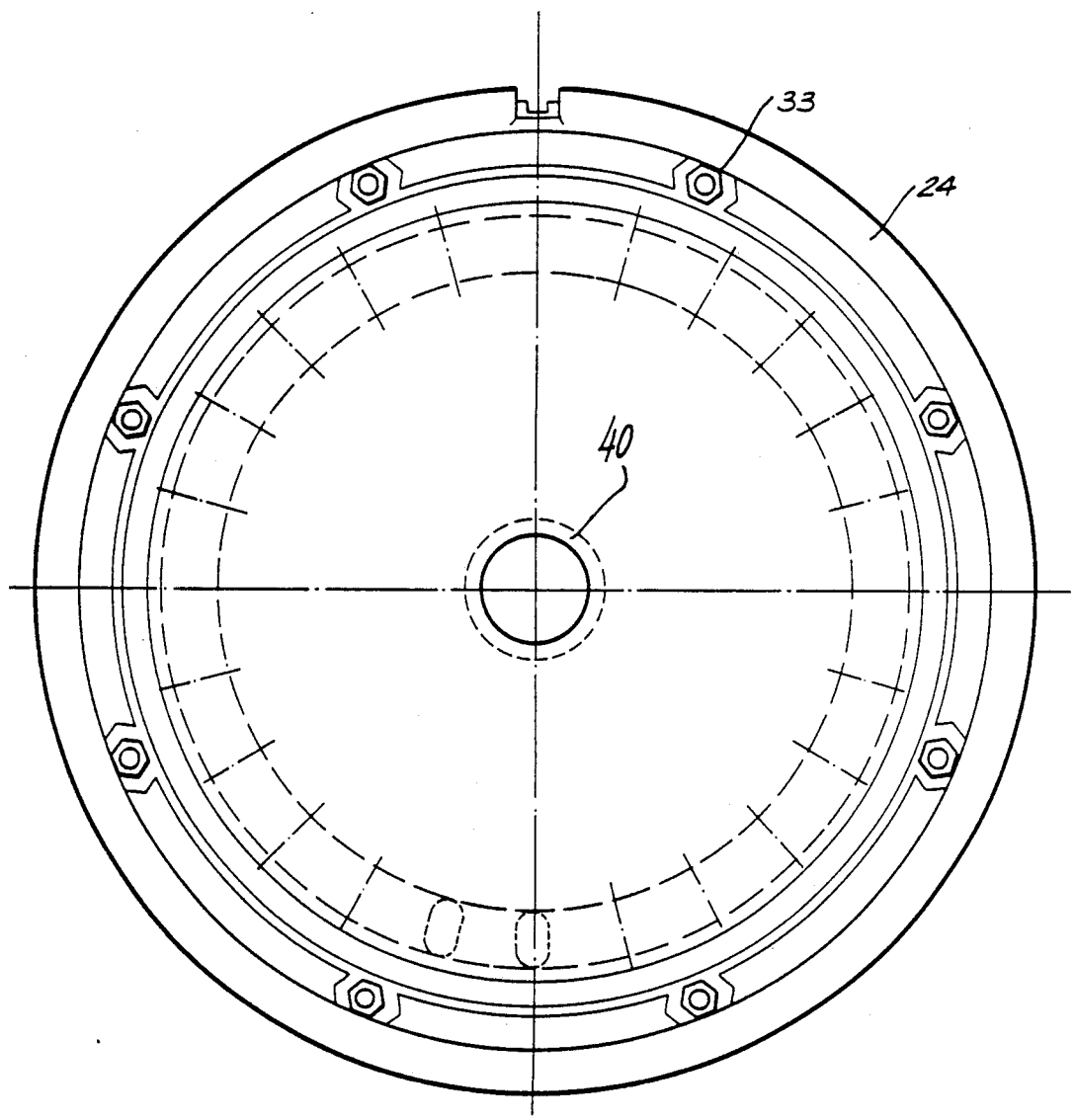
Figure 5:
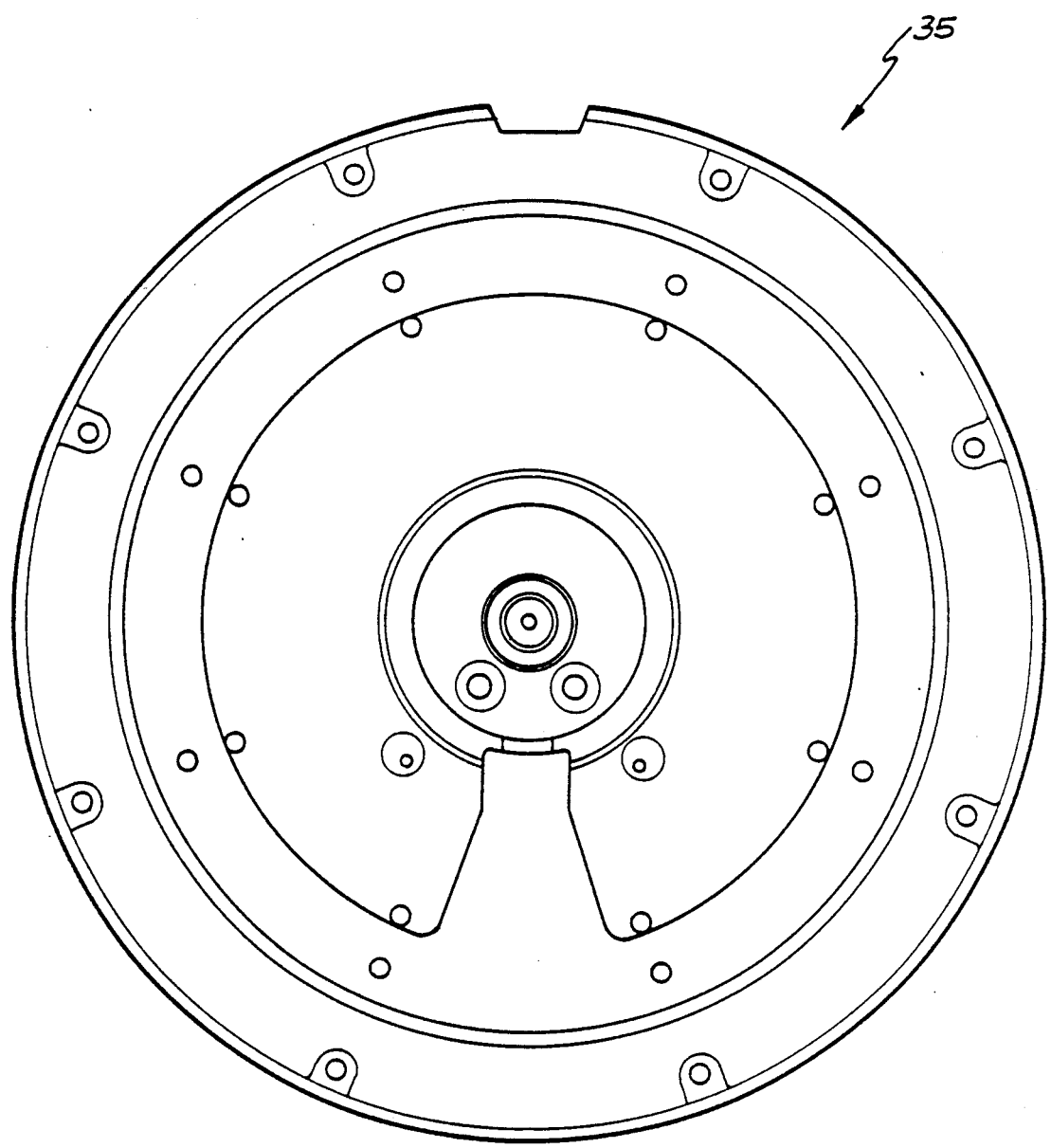
Figures 6, 7:
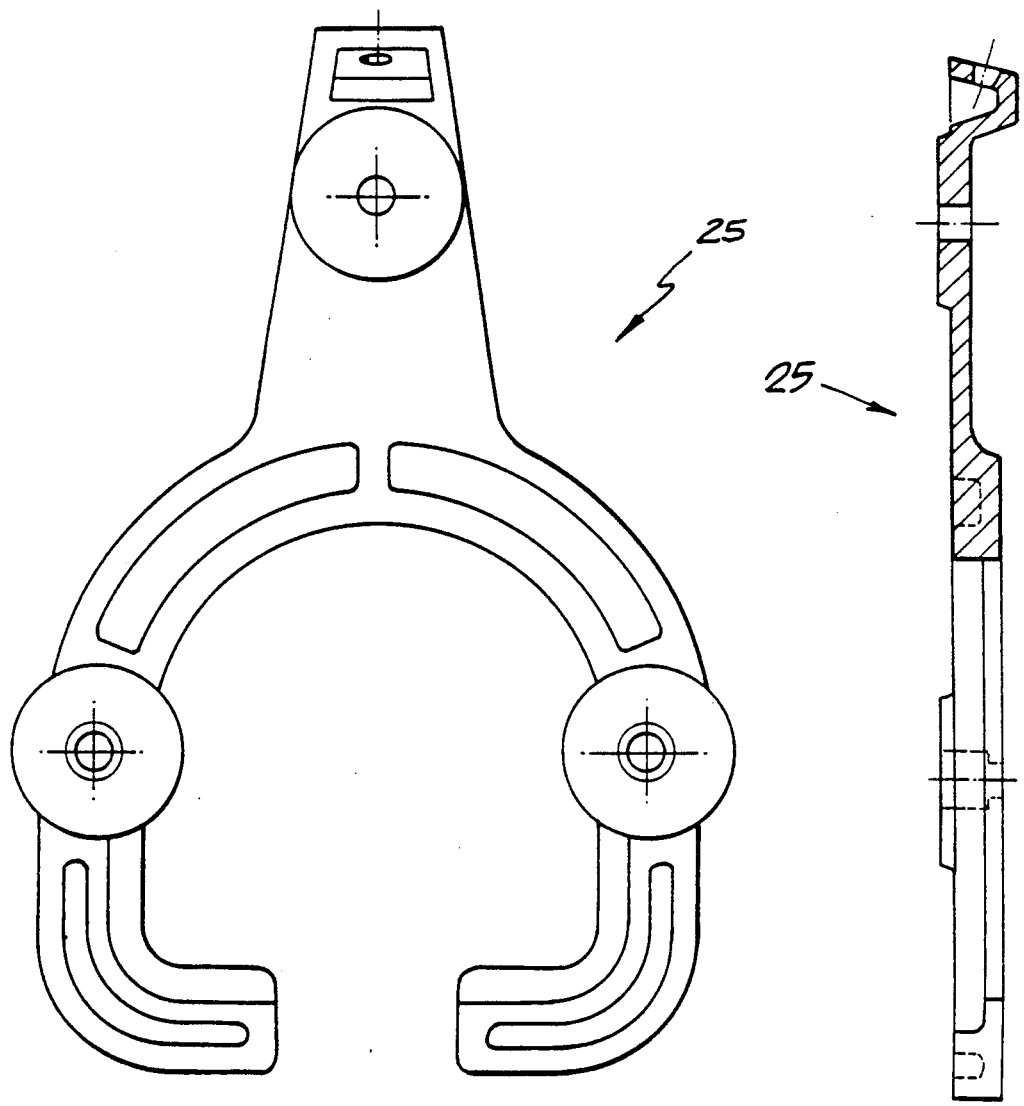

FIG. 2 is a longitudinal cross-sectional view of the apparatus of one embodiment, FIG. 3 is a longitudinal cross-sectional view of the apparatus of a second embodiment, FIG. 4 is a front view of the outer cover the apparatus of FIG. 3, FIG. 5 is a front view of the backing plate of the apparatus of FIG. 4, FIG. 6 is a side view of a mounting bracket for use with apparatus of FIG. 3, and FIG. 7 is a front view of the mounting bracket of FIG. 5.

The apparatus 1 of a preferred embodiment as illustrated in FIG. 2 of the drawing is mounted on the side wall 2 of a swimming pool 3. The apparatus is located within the swimming pool 3 under the surface of the water 4 and comprises a mounting bracket 5 which is securely placed to the side wall 2.

Over the mounting bracket 5 a cover or saucer shaped housing 6 is fitted. The rim of the cover 6 is substantially flush with the side wall of the swimming pool. The housing 6 has a plurlaity of inlet openings 7 and outlet openings 8 located therein. Within the housing 6 and mounted on a backplate 15 is an annular anode 9 and an annular cathode 10. The anode 9 and the cathode 10 are located substantially adjacent to each other with the cathode 10 being located within the anode 9 in this particular example. The radius of the cathode 10 therefore is smaller than the anode 9. The annular rings of the anode 9 and cathode 10 are not complete as there is a gap between the ends of both of them. The anode 9 and cathode 10 are connected to an extra low voltage direct current power supply 11 through a junction box 12. A cable gland 13 protects the power supply cable 14 as it passes through the backplate 15 of the mounting bracket 5.

The anode 9 and the cathode 10 are mounted onto the mounting bracket 5 by means of a friction fit into a pair of circular grooves 16 in a circular protrusion 17.

In the embodiment illustrated in FIGS. 3 and 4 the apparatus 21 comprises a mounting bracket 25 onto which a housing 26 is mounted. The housing 26 includes a backing plate 35 which fits over the mounting bracket 25 and is held in position by its weight, and a saucer like cover 24 which fits over the outside edge of said backing plate 35 and is preferably secured thereto by means of a plurality of bolts 33. The cover has a plurality of inlet openings 27 and outlet opening 28 to allow the water to pass in and out of the housing 26.

Located with the housing 26 are in this embodiment a plurality of annular cathodes 30 and annular anodes 29, with the cathodes 30 and anodes 29 alternating in a series of co-axial annular rings. The cathodes 30 and anodes 29 are secured to the backing plate 35 which is made from an insulator material preferably polypropylene. The anodes 29 and cathodes 30 are annular rings having have gaps therein similar to the other embodiment.

The anodes 29 and cathodes 30 are connected to an extra low voltage in a similar manner to the first embodiment. A junction box 32 and cable gland 33 are illustrated in FIG. 3. A light 40 is an optional addition, whereby the light is attached to the middle of the cover 24. The light 40 is powered by the electric power supply.

In operation, the apparatus 1 and 21 is installed below the water level in the swimming pool 3 and a suitable amount of sodium chloride is dissolved in the water. The power supply is applied to the anode 9 and 29 and the cathode 10 and 30 which causes the electrolysis process to commence. The electrolysis produces chlorine gas which immediately combines with the water to form sodium hypochlorite, which is the sterilizing agent. Hydrogen gas is also liberated during this process. As the hydrogen bubbles rise through the housing 6 and 26 convection currents are created thus causing water to circulate through the apparatus 1 and 21 thus introducing non-electrolyzed salt water into the area around the anode 9 and 29 and cathode 10 and 30. Extra circulation within the swimming pool caused by a reticulation pump (not illustrated) ensures that the water in the swimming pool is continually chlorinated and therefore sterilized.

There is also the provision for automatic cleaning of the electrodes by reversing the polarity on each of the electrodes.

The foregoing describes only one embodiment of the present invention, and modifications obvious to those skilled in the art can be made thereto without departing from the scope of the present invention.

For example, the electrodes do not have to be shaped as annular rings but can be shaped as a plurality of parallel plates.

What I claim is:

1. Apparatus for the chlorination of water in a swimming pool where the water includes a soluble chlorine ion containing electrolyte, said apparatus comprising a housing which is mountable on a side wall of said swimming pool, said housing having at least one opening for the water to pass therethrough, at least one pair of electrodes being supplied by a power supply located with said housing, wherein the convection of the pool water through the opening(s) causes electrolysis of the soluble chlorine ions when they come into contact with said electrodes to produce a chlorination effect of said water, wherein said apparatus housing is mounted to a bracket attached to the side of said swimming pool, said housing being of two parts which are fitted together, wherein the electrodes are shaped as annular rings having gaps located in the rings, the annular rings being substantially co-axial.

2. Apparatus according to claim 1 wherein a first one of the two parts which is mounted to the bracket is adapted to have said electrodes mounted thereto.

3. Apparatus according to claim 2 wherein the electrodes are mounted in slots arranged on said bracket.

4. Apparatus according to claim 1 wherein the housing having two parts includes a cover and a backing plate which is mounted on the bracket, the cover is in the shape of a saucer and is flush to the side of the swimming pool.

5. Apparatus according to claim 4 wherein there are a plurality of openings in said housing, with a plurality of inlet openings located at the lower side of said housing and a plurality of outlet openings located at the upper side of said housing.

6. Apparatus according to claim 5 wherein the power supply is a low voltage direct current supply, and it supplies power to the electrodes as well as a light which is attached to the cover.

7. Apparatus according to claim 6 wherein a reverse polarity is applied to each of the electrodes for cleaning purposes.

8. Apparatus for the chlorination of water in a swimming pool where the water includes a soluble chlorine ion containing electrolyte, said apparatus comprising at least one pair of electrodes supplied by a power supply, first means for housing said electrodes, said first means comprising second means for mounting said first means on a side wall of said swimming pool in submerged condition, said first means being provided with at least two spaced openings for allowing the water to circulate through the first means, said openings being disposed in said first means such that the convection currents in the water of the pool cause the water to circulate through the first means while the first means is mounted on the wall in submerged condition, said electrodes being mounted and disposed within said first means and in relation to said spaced openings such that the water circulating through the first means due to the convection currents will come into contact with the electrodes and be electrolyzed whereby the convection of the pool water through the openings produces a chlorination effect of the water, which chlorinated water then passes through at least one of said openings into the pool.

9. An apparatus as claimed in claim 8 wherein the electrolysis of the chlorine ion containing electrolyte causes a release of gas which creates a convection current within the water in the first means with the first means in submerged condition and wherein the third means disposes said electrodes within the first means such that the current created by the release of gas aids the circulation of water through the first means.

10. An apparatus as claimed in claim 8 wherein said first means is an apparatus housing, said housing being provided with at least an inlet opening located in a lower part of said housing and an outlet opening located in an upper part of said housing, said electrodes being disposed in said housing above said inlet opening and below said outlet opening whereby chlorine ion containing electrolyte in water circulating through the housing due to the convection of the water will come into contact with the electrodes and be electrolyzed.

11. Apparatus according to claim 10 wherein the second means comprises a bracket and wherein said apparatus housing is attachable by the bracket to the side of said swimming pool, said housing being of two parts which are fitted together.

12. Apparatus according to claim 11 wherein a first one of the two parts which is mounted to the bracket is adapted to have said electrodes mounted thereto.

13. Apparatus according to claim 12 wherein the electrodes are mounted in slots arranged on said bracket.

14. Apparatus according to claim 11 wherein the housing having two parts includes a cover and a backing plate which is mounted on the bracket, the cover is in the shape of a saucer and is flush to the side of the swimming pool.

15. Apparatus according to claim 14 wherein there are a plurality of openings in said housing, with a plurality of inlet openings located at the lower side of said housing and a plurality of outlet openings located at the upper side of said housing.

16. Apparatus according to claim 15 wherein the power supply is a low voltage direct current supply, and it supplies power to the electrodes as well as a light which is attached to the cover.

17. Apparatus according to claim 16 wherein a reverse polarity is applied to each of the electrodes for cleaning purposes.

18. Apparatus according to claim 17 wherein the electrodes are shaped as annular rings having gaps located in the rings, the annular rings being substantially co-axial.

* * * * *